United States Patent [19]

Williams et al.

[11] 4,441,790
[45] Apr. 10, 1984

[54] LIFT TRUCK SAFETY MIRROR

[76] Inventors: David M. Williams, 165 Riker Ter., Salinas, Calif. 93901; Charles L. Curtis, 295 Zabala Rd., Salinas, Calif. 93908

[21] Appl. No.: 290,853

[22] Filed: Aug. 7, 1981

[51] Int. Cl.³ .............................................. B60R 1/10
[52] U.S. Cl. .................................... 350/302; 350/307
[58] Field of Search ................ 350/289, 301, 302, 307

[56] References Cited

U.S. PATENT DOCUMENTS

| | | |
|---|---|---|
| 1,748,837 | 2/1930 | Greensfelder . |
| 2,085,000 | 6/1937 | Borba et al. . |
| 2,302,952 | 11/1942 | Pfeifer . |
| 2,334,411 | 11/1943 | Humphrey . |
| 2,346,739 | 4/1944 | Ewing . |
| 2,374,956 | 5/1945 | Rubissow . |
| 2,467,266 | 4/1949 | Lumsden . |
| 2,732,764 | 1/1956 | Parks . |
| 2,758,508 | 8/1956 | Petri et al. . |
| 3,005,383 | 10/1961 | Pierson . |
| 3,059,790 | 10/1962 | Augustus . |
| 3,178,042 | 4/1965 | Augustus . |
| 3,697,157 | 10/1972 | Pizzimenti et al. ................. 350/302 |
| 3,744,885 | 7/1973 | Hurtado et al. ..................... 350/307 |
| 3,788,735 | 1/1974 | Rowley ............................... 350/302 |
| 3,846,016 | 11/1974 | Firstenberg ......................... 350/302 |
| 4,172,638 | 10/1979 | Freedman ........................... 350/302 |
| 4,286,840 | 9/1981 | Covert ................................ 350/289 |

FOREIGN PATENT DOCUMENTS 3013225 10/1981 Fed. Rep. of Germany ...... 350/307

Primary Examiner—F. L. Evans
Attorney, Agent, or Firm—Brown & Martin

[57] ABSTRACT

An over the load viewing system for lift trucks and the like, includes a first mirror fixed in position in the line of sight of the vehicle operator with a second mirror pivotally mounted on arms extending above the vehicle and moveable on the arms between a viewing position and retractable to a non-viewing position with latch means for latching the second mirror assembly in the viewing position and uni-directional drive means for rotating the mirror to the viewing position.

11 Claims, 4 Drawing Figures

U.S. Patent  Apr. 10, 1984  4,441,790
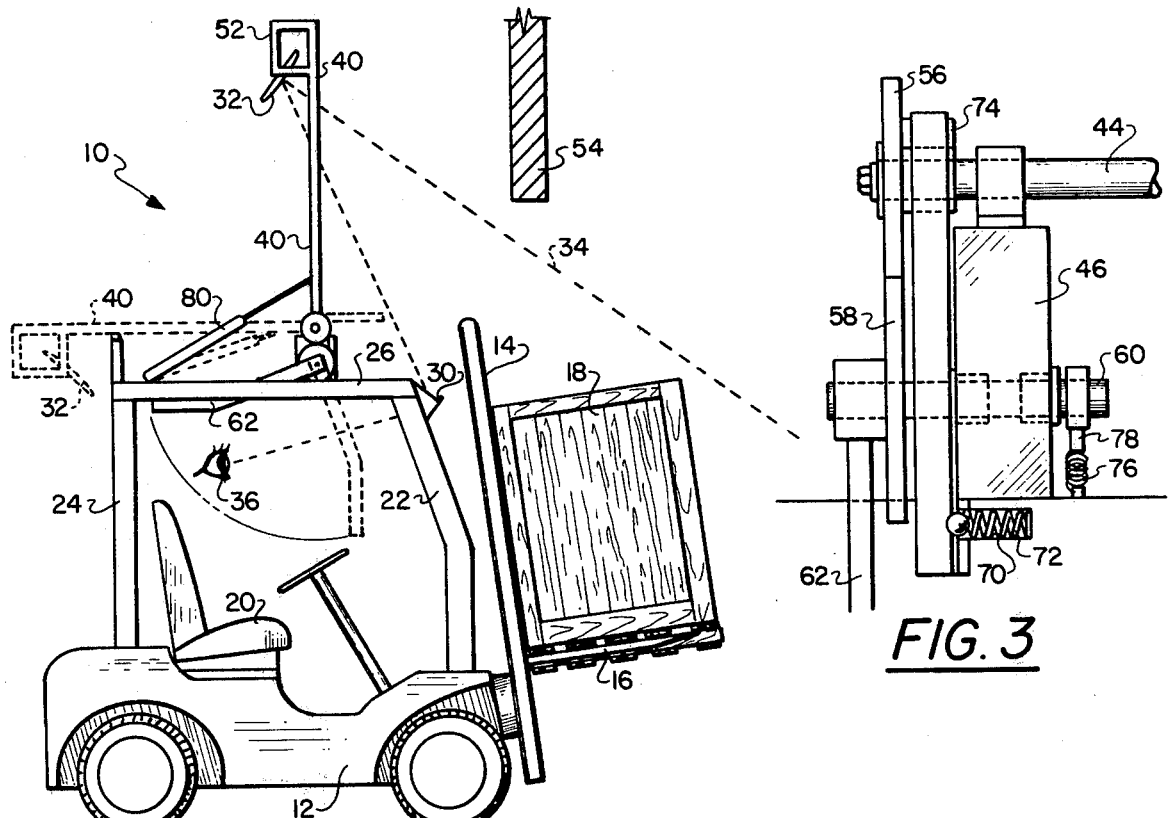
FIG. 1
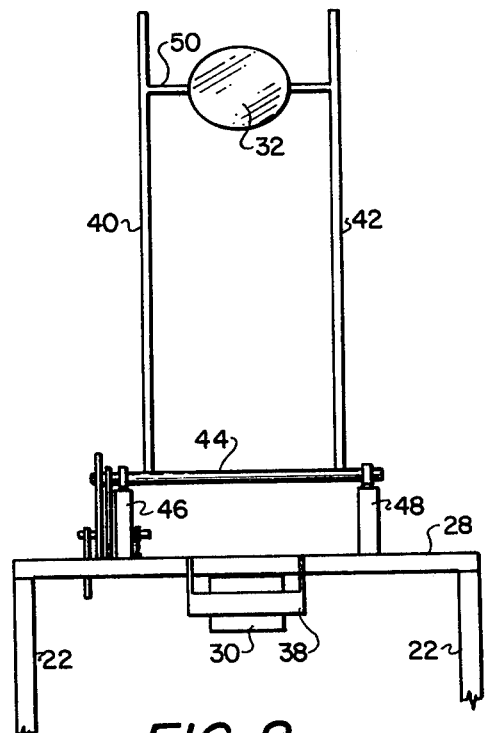
FIG. 3
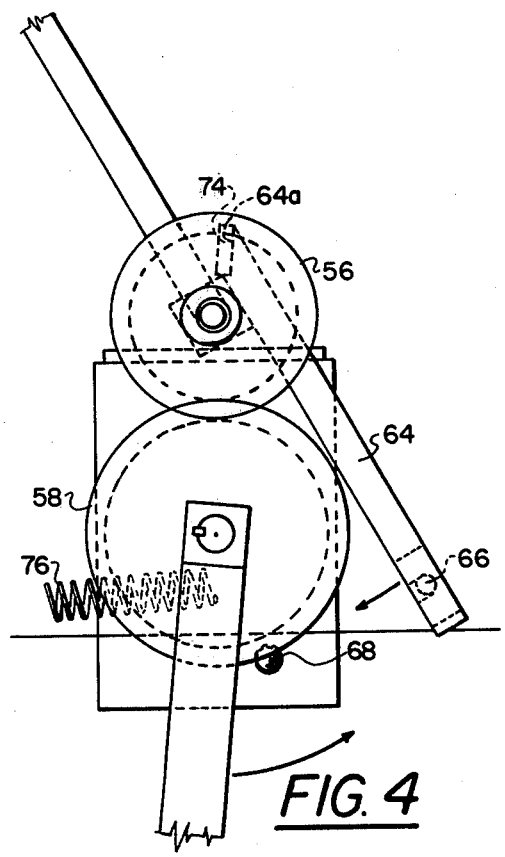
FIG. 4
FIG. 2

LIFT TRUCK SAFETY MIRROR

BACKGROUND OF THE INVENTION

The present invention relates to mirror systems and pertains particularly to an overload viewing system for lift trucks and the like.

Many cargo handling vehicles such as lift trucks, and the like handle cartons and other cargo items that frequently obstruct the view of the operator. When loading the cargo space of transport vehicles, the load carried by the lift truck is frequently limited only by the doorway into the vehicle compartment. It is desirable when handling such cargo and operating such cargo handling vehicles that the operator be able to view the area immediately in front of the vehicle. This is desirable, not only for safety reasons but also for reasons of efficiency. Viewing this area, enables the operator to handle the vehicle in a more precise and efficient manner.

It is therefore desirable that some means be available which permits the operator of a lift truck and like vehicles to view the area in front of his load.

SUMMARY AND OBJECT OF THE INVENTION

It is the primary object of the present invention to provide an improved viewing system for a lift truck.

In accordance with the primary aspect of the present invention, a mirror arrangement provides a viewing system for enabling a vehicle operator to view the area immediately in front of the vehicle load. The viewing system includes a retractable mirror moveable from and between a viewing position and a retracted non-viewing position.

BRIEF DESCRIPTION OF THE DRAWINGS

The above and other objects and advantages of the present invention will become apparent from the following description when read in conjunction with the drawings wherein:

FIG. 1 is a side elevational view of a lift truck with a system in accordance with the invention mounted thereon.

FIG. 2 is a front elevation view of the viewing system.

FIG. 3 is an enlarged front elevational view of a portion of the system.

FIG. 4 is an enlarged side elevational view of a portion of the system.

DETAILED DESCRIPTION OF A PREFERRED EMBODIMENT

Turning to the drawings, there is illustrated a fork lift truck equipped with a mirror assembly in accordance with the invention designated generally by the numeral 10. The truck 12 is illustrated as a fork lift type with a mast assembly 14 including forwardly extending forks 16 for engaging beneath and raising a load such as a carton 18. The truck includes an operator station or seat 20 from which the operator manipulates the controls of the vehicle. Extending around and over the operator is a roll protection assembly including fore and aft upright 22 and 24 respectively with side rails or frame members 26 and a cross member 28.

This is a somewhat standard arrangement for cargo handling or loading vehicles of the type to which the present invention is particularly adaptable. The mirror arrangement and viewing system of the present invention enables an operator who is seated on the vehicles in a position to manipulate the controls thereof to view the area in front of his load. Having a viewing position designated by the numeral 36, the operator has to have a line or view sight which includes a fixed mirror 30 and a retractable mirror 32 and designated by the broken line 34, to view over the load or cargo 18 of the truck. The mirror system includes a mirror 30 which is fixed to a generally U shaped bracket.

Turning to FIG. 2, the mirror assembly includes the fixed mirror 30 which although may be adjustable is fixed to a bracket 38 in a fixed location and oriented to view the moveable mirror 32 from the viewing position 36 of the vehicle operator. The moveable mirror 32 is mounted on a retractable assembly which includes a pair of spaced apart elongated arms 40 and 42 which are secured at their lower ends to a rotatably shaft 44 which is rotatable journaled in bearings in bearing brackets 46 and 48 and mounted on suitable support means such as cross bar 28. The mirror 32 is mounted on a cross bar 50 which is mounted at the lower aft corner of a rectangular frame assembly 52 as which can be seen in FIG. 1. This places the mirror 32 behind the 2 parallel arms 40 and 42 and thus, when the arms engage an overhead structure the mirror is shielded from impact and damage. The moveable or upper mirror assembly is moveable or pivotal between an upright viewing position as shown in FIGS. 1 and 2 and a lowered or retracted position as shown in phantom in FIG. 1. The lowered position as shown in FIG. 1 permits the lift truck to pass beneath overhead structures such as door frames or the like 54.

The mirror assembly includes a one-way or unidirectional drive assembly and latching mechanism as will be described. This drive mechanism as shown in more detail in FIGS. 3 and 4 includes an upper drive gear 56 which is rotatably mounted on the shaft 44 and meshes with a lower drive gear 58 which is mounted to rotate with a rotatable shaft 60 journaled in bearings in a bore in the lower end of the bearing bracket 46. A drive arm 62 is drivingly connected to the shaft 60 for rotation of the shaft upon pivotal movement of the arm along an arc from the respective positions as shown in FIG. 1.

A latch arm 64 is secured to and rotates with the shaft 44 and includes a detent depression 66 which is engagable by a spring biased detent ball 68 mounted within a bore 70 with a bias spring 72. A drive lug 74 extends outward from the side of the drive gear 56 and engages the upper end 64a of the detent arm 64.

A retracting spring 76 as seen in FIGS. 3 and 4 is connected to the outer end of a arm 78 on shaft 60 and functions to bias or rotate the shaft and thereby arm 62 to a retracted position as shown in FIG. 1. This retracts the drive lever 62 to the upper position as shown in FIG. 1 out of the way of the operator. The lost motion drive which includes the drive tab 74 engagement with the detent arm 64 secured to shaft 44 acts to rotate the shaft 44 for raising the mirror 32 to the upright position as shown in FIG. 1 when the drive arm 62 is moved downward to the phantom position as shown in FIG. 1. Upon the release of the drive arm after the mirror has been raised to its raised position and the detent mechanism 66, 68 has engaged to hold the arm 64 in position and thereby hold the mirror in the upright position, the drive arm 62 is retracted to the upper position as shown in FIG. 1 by the retracting spring 76. One or more dashpots 80 connected between the upright arms 40 and 42 and the fixed frame member 26 function to dampen the dropping of the mirror assembly upon impact with a overhead structure such as the door frame 54.

In operation, the mirror or viewing system as described above is elevated by a manual drive system to its viewing position as shown in FIG. 1 to enable that operator to view the area in front of a load 18. The operator, by viewing this area can more safely and accurately maneuver his vehicle and the cargo carried thereby. Upon the entrance of the vehicle through a doorway or the like having a lowered overhead clearance such as at 54 the upright arms 40 and 42 engage the overhead structure and are forced backward to overcome the friction detent means 66 and 68 enabling the overhead mirror to drop under the action or force of gravity to its horizontal position, as shown in phantom in FIG. 1. Upon clearance of overhead structure, the operator then simply reaches above his head, grasps the drive lever 62 and pulls the upper mirror structure back to the upright position as shown in FIG. 1. Then arm 64 is likewise driven downward to a position of detent engagement to retain the upper mirror structure in its upright position as shown.

While we have illustrated and described our invention by means of specific embodiments, it is to be understood that numerous changes and modifications may be made in the invention without departing from the spirit and scope thereof as defined in the appended claims.

We claim:

1. An overload viewing system for a fork lift truck type cargo handling vehicle for viewing forwardly over a forward positioned load, said viewing system comprising:
   a first mirror in the line of sight of the vehicle operator,
   a pivoting arm assembly, and a second mirror mounted on said pivoting arm assembly above said first mirror for pivotal movement between a viewing position to establish a line of sight from the operator via said first mirror and said second mirror forwardly over a normal forward positioned load of said vehicle, and a retracted position to permit passage of the vehicle beneath a low clearance.

2. The viewing system of claim 1 wherein said pivoting arm assembly includes a shaft mounted for rotation about a horizontal axis,
   a pair of spaced apart mirror support arms secured at an inner end and extending radially outward from said shaft, and said mirror is mounted at the outer end of said arms, and said arms are pivotal on said shaft between a vertically extending position and a horizontally extending position.

3. The viewing system of claim 2 including detent means for releasably retaining said mirror support arms in said vertically extending position for retaining said second mirror in said viewing position.

4. The viewing system of claim 3 including unidirectional drive means for moving said mirror support arms to the vertical position for moving said second mirror into the viewing position.

5. The viewing system of claim 4 wherein said drive means includes a hand actuated lever movable from a retracted position to an extended position for moving said mirror support arms to said vertical position; and
   biasing means for normally biasing said lever arm to said retracted position.

6. The viewing system of claim 2 wherein said second mirror is mounted in a shielded position between said arms and aft of the front surface thereof.

7. The viewing system of claim 1 wherein said second mirror is moveable to said retracted position in response to an external force.

8. The viewing system of claim 5 wherein said detent means includes a detent arm secured to and extending radially outward from said shaft, and a spring biased friction member for frictional engagement of said detent arm when said mirror support arms are in the vertical position.

9. The viewing system of claim 8 wherein said drive means includes a first gear driven by said hand lever, and a second gear driven by said first gear and including lug means for unidirectional engagement and movement of said detent arm.

10. The viewing system of claim 9 wherein said second mirror is mounted in a shielded position between said arms and aft of the front surface thereof.

11. The viewing system of claim 12 wherein said second mirror is moveable to said retracted position in response to an external force.

* * * * *

UNITED STATES PATENT AND TRADEMARK OFFICE
CERTIFICATE OF CORRECTION

PATENT NO. : 4,441,790
DATED : April 10, 1984
INVENTOR(S) : DAVID M. WILLIAMS

It is certified that error appears in the above-identified patent and that said Letters Patent are hereby corrected as shown below:

On the title page,

Immediately below the inventor's name and address data, insert --Assignee; Eagle Research & Development, Inc.--.

Column 4, Claim 11, line 44, change "12" to --10--.

Signed and Sealed this

Eleventh Day of September 1984

[SEAL]

Attest:

Attesting Officer

GERALD J. MOSSINGHOFF

Commissioner of Patents and Trademarks